(12) United States Patent
Levin

(10) Patent No.: US 7,455,781 B2
(45) Date of Patent: Nov. 25, 2008

(54) METHOD AND SYSTEM OF DESTRUCTION OF VOLATILE COMPOUNDS IN WASTEWATER

(75) Inventor: Alexander Levin, Haifa (IL)

(73) Assignee: Elcon Recycling Center (2003) Ltd., Haifa (IL)

( * ) Notice: Subject to any disclaimer, the term of this patent is extended or adjusted under 35 U.S.C. 154(b) by 549 days.

(21) Appl. No.: 11/073,475

(22) Filed: Mar. 7, 2005

(65) Prior Publication Data

US 2006/0196358 A1 Sep. 7, 2006

(51) Int. Cl.
*B01D 19/00* (2006.01)
(52) U.S. Cl. .................................. 210/749; 95/263
(58) Field of Classification Search ............ 95/263, 95/253; 210/749
See application file for complete search history.

(56) References Cited

U.S. PATENT DOCUMENTS

| | | | |
|---|---|---|---|
| 2,119,721 A * | 6/1938 | Richardson | ............... 252/372 |
| 4,594,131 A | 6/1986 | Maier | |
| 4,898,107 A | 2/1990 | Dickinson | |
| 5,589,142 A * | 12/1996 | Gribbon | ............... 422/171 |
| 5,955,037 A * | 9/1999 | Holst et al. | ............... 422/171 |
| 6,878,188 B2 * | 4/2005 | Yi | ............... 95/245 |

FOREIGN PATENT DOCUMENTS

| | | |
|---|---|---|
| DE | 4114386 | 11/1992 |
| EP | 0354656 | 2/1990 |

* cited by examiner

*Primary Examiner*—Walter D. Griffin
*Assistant Examiner*—Cameron J Allen

(57) ABSTRACT

The invention proposes a method of destruction of volatile organic and inorganic compounds in wastewater, this method includes following stages: stripping the aforementioned volatile compounds in a stripping-chemisorption column; preliminary heating the gaseous medium containing these volatile compounds in a first heat regenerator; thermal, flare or thermo-catalytic oxidation of the volatile compounds in circulating gaseous medium; cooling the gaseous medium in a second heat regenerator; chemisorption of acidic gases from the gaseous medium in the stripping-chemisorption column with stripping at the same time additional amount of the volatile compounds from the wastewater. After specific period, direction of the gaseous medium flow is alternated. The proposed method can be executed at elevated temperature. The invention includes as well systems realizing the proposed method.

18 Claims, 5 Drawing Sheets

METHOD AND SYSTEM OF DESTRUCTION OF VOLATILE COMPOUNDS IN WASTEWATER

CROSS-REFERENCE APPLICATION

Not Applicable

FEDERALLY SPONSERED RESEARCH OF DEVELOPMENT

Not Applicable

BACKGROUND OF THE INVENTION

The problem of treatment of wastewater contaminated with volatile organic or inorganic compounds becomes very pressing for many facilities and for many branches of industry. In some cases, volatile organic and inorganic compounds present a major contributor to overall pollution in a facility.

There are different methods of volatile organic and inorganic compounds control in wastewater.

Detailed review of these methods is presented in the article: Victor H. Edwards "VOC-Control Options During Wastewater Treatment" CHEMICAL ENGINEERING, September 2000, pp. 105÷108.

According to this article, all methods of control of volatile organic and inorganic compounds in wastewater can be classified under two main types: 1) with transfer of volatile organic and inorganic compounds from wastewater into vapor phase by distillation, air stripping, steam stripping, inert-gas stripping, fuel-gas stripping, vacuum distillation and vacuum stripping; 2) with transfer of volatile organic and inorganic compounds into a liquid or solid phase: solvent extraction, liquid ion exchange, reverse osmosis, adsorption, ion exchange and precipitation.

Each aforementioned method is distinguished by its advantages and drawbacks.

In the case of application of air stripping related to the first group, this method should be combined with an additional method for treating air laden with volatile organic and inorganic compounds. There are several physicochemical methods of such additional treatment: flare, feed to a furnace or boiler, feed in a thermal or catalytic incinerator, condensation, cryogenic condensation, adsorption using activated carbon, alumina or zeolites.

Each of these additional methods has in turn several advantages and disadvantage related to its cost, efficiency, reliability and safety. As it is known from technical literature (see, for example, "THERMAL AND THERMO-CATALYTIC TREATMENT OF WASTE GASES" Naukova Dumka, 1984, pp. 17÷22 (in Russian)), thermal method of oxidation of waste gases requires about of 26÷45 kg of liquid fuel per 1000 $m^3$ of waste gases and the thermo-catalytic method −15÷25 kg of liquid fuel correspondingly. It is clear, that higher concentration of volatile organic and inorganic compounds in the volatile organic and inorganic compounds-laden air after the air stripping process causes diminishment of a liquid or gaseous fuel required for thermal or thermo-catalytic oxidation of volatile organic and inorganic compounds presented in the wastewater.

In order to achieve higher concentration of volatile organic and inorganic compounds in the volatile organic and inorganic compounds-laden air it is possible to perform the air stripping process with a stage of previous heating wastewater in a heat exchanging unit, it allows achieving higher concentration of volatile organic and inorganic compounds in air after stripping process and, on the other hand, to treat wastewater containing volatile organic compounds with relatively high temperature of boiling at the atmospheric pressure.

In addition, the rate of stripping at elevated temperature is substantially higher, i.e. for the same size of an air-stripping tower, it is possible to treat greater amount of wastewater in the same period.

However, the common process of air stripping at elevated temperature is characterized by great heat losses at the expense of enhanced water evaporation into the volatile organic and inorganic compounds-laden air. As a result, energy cost for wastewater treatment by air stripping at elevated temperatures is very high.

BRIEF SUMMARY OF THE INVENTION

A proposed technical solution is based on the stripping-chemisorption process performed mainly at elevated temperature.

A system of treatment of volatile organic and inorganic compounds contained in wastewater comprises some main units: a tank filled with the wastewater; two stripping-chemisorption columns installed on the tank through two connecting branches; two fans or blowers causing circulation of the gaseous medium through the system with periodical alternation of circulation direction; two heat regenerators that operate in opposite phases with periodical alternation their modes; a unit of thermal, flare or thermo-catalytic oxidation of volatile organic and inorganic substances contained in the circulating gaseous medium.

The wastewater in tank has alkali reaction (pH >7); it can be achieved by addition of alkali substances into the wastewater. This serves for chemisorption of acidic gases obtained by thermal, flare or thermo-catalytic oxidation of the organic or/and inorganic compounds evaporated previously in the stripping-chemisorption columns. The system is provided with an inlet connection for oxygen delivery and with an outlet connection for blowing out the system, especially, at the initial stage of its operation.

The unit of thermal, flare or thermo-catalytic oxidation (incineration) of volatile organic and inorganic compounds contained in the gaseous medium can be designed in flare, thermal or thermo-catalytic forms.

A circulation pump associated with the tank performs supply of the wastewater from this tank to the upper section(s) of the stripping-chemisorption column(s), which are installed on the tank through the aforementioned connecting branches.

The upper edges of the stripping-chemisorption columns are joined in turn with the bottoms of fixed packed beds (heat regenerators) serving for periodic accumulation of heat from the gaseous medium after flare, thermal or thermo-catalytic oxidation of volatile organic and inorganic compounds contained in this gaseous medium and its preheating before their flare, thermal or thermo-catalytic oxidation. The upper edges of these fixed packed beds (heat regenerators) are communicating with a unit of flare, thermal or thermo-catalytic oxidation.

Besides, in the case of thermo-catalytic oxidation, there are two modules of ultimate heating situated between the unit of flare, thermal or thermo-catalytic oxidation and the heat regenerators.

Both connecting branches, which are installed on the tank, are joined by two parallel channels, which are provided with demisters and shutters installed in their extreme sections; the fans are installed in these channels and actuated alternatively in accordance with modes of the heat regenerators, they cause circulation of the gaseous medium through the entire system.

The basic processes in the entire system include: stripping-chemisorption by the stripping-chemisorption columns, preheating the gaseous medium by one of the heat regenerators, thermal, flare or thermo-catalytic oxidation in the thermal or thermo-catalytic oxidation unit, and heat accumulation in the other heat regenerator.

There are two tubular branches inserting from the lower edges of the connecting branches into the wastewater in the tank, it allows to prevent bypass flow of the gaseous medium via the upper space of the tank (if this tank is not filled completely with the wastewater).

In the case of thermal oxidation of volatile organic and inorganic compounds in the circulating gaseous medium, it is possible to design the heat regenerators and the thermal oxidation unit as a combined module in the form of a tube from refractory material with an internal packing; the middle section of the tube is provided with a heating means (electrical or flare) and the extreme sections of this refractory tube with the internal packing serve as the heat regenerators.

In another version, the fans are installed between the stripping-chemisorption column and the heat regenerators. In this version, the stripping-chemisorption columns are installed directly on the tank with wastewater (without application of the connecting branches) and the aforementioned tubular branches inserted in the space of the wastewater tank are not applied. The upper internal section of the tank, which is not filled with the wastewater, serves in this case for circulation of the gaseous medium and the aforementioned parallel channels are not applied as well.

The tank can be provided with a build-in or external heat-exchanging module.

In addition, the proposed system is provided with proper control equipment and valves.

The proposed system, when it is designed for thermo-catalytic oxidation of volatile organic and inorganic compounds, operates in the following manner:
- the tank should be filled with wastewater contaminated with volatile organic and inorganic compounds;
- if it is necessary, the wastewater temperature in the tanks is established at a level, which is required for rapid and safety stripping volatile organic and inorganic compounds with their following oxidation in gaseous medium;
- alkalinity of this wastewater in the tanks can be established previously or in the process of oxidation of volatile organic and inorganic compounds at a level, which ensures complete neutralization and chemisorption of acidic gases obtained as the result of oxidation of these volatile organic and inorganic compounds;
- the circulation pump is actuated and it supplies the wastewater from the tank into one or both stripping-chemisorption columns; if it is necessary, the wastewater temperature in this tank is established by its heat-exchanging module;
- at the same time, one of fans is actuated in such a way, that it causes circulation of the gaseous medium in the entire system when this gaseous medium flows co-currently or counter-currently regarding the wastewater flow in the operating stripping-chemisorption columns;
- after preheating the gaseous medium in one fixed packed bed (heat regenerator) and its ultimate heating by the electrical heater in the module of ultimate heating the gaseous medium passes through the catalytic bed, and volatile organic and inorganic compounds contained in the gaseous medium are oxidized by oxygen presented in the gaseous medium;
- then the gaseous medium is pre-cooled in the opposite heat regenerator;
- oxygen or air is steadily supplied into the gaseous medium in accordance with amount of oxygen which is run out for oxidation of volatile organic and inorganic compounds in the gaseous medium.

Finally cooling is performed in the following operating stripping-chemisorption column(s) itself. Besides, this operating stripping-chemisorption column provides additional evaporated portions of volatile organic and inorganic compounds into the circulating gaseous medium, causes absorption of the oxidation products in the wastewater and regulates the water vapors' content in the gaseous medium.

As the average temperature in the heat regenerator, which serves at this point for cooling the gaseous medium after the unit of thermo-catalytic oxidation, is elevated up to a certain level, operation of the fans is alternated, i.e. the first fan will be in its idle state and the second fan begins to circulate the gaseous medium through the system in opposite direction. As this takes place, the second module of ultimate heating is actuated instead of the first module.

After getting sufficiently low concentration of volatile organic and inorganic compounds in the wastewater, the process is finished and the wastewater is discharged from the tank.

In order to indicate temperature change and volatile organic and inorganic compounds' concentration in the wastewater or in the gaseous medium, the system is provided with a proper monitoring unit.

It is possible to simplify the system described above by introduction of four shutoff dampers. In this case, there is only one stripping-chemisorption column. Closing and opening the diagonally positioned pairs of the shutoff dampers can alternate direction of the gaseous medium flow via the aforementioned fixed packed beds.

Two modules of ultimate heating and one module of thermo-catalytic oxidation are positioned between these fixed packed beds (heat regenerators), the modules of ultimate heating are energized alternatively in accordance with direction of the gaseous stream. This version gives possibility to apply only one fan.

If wastewater contains volatile organic acid, for example—acetic acid, than stripping and chemosorption processes should be performed in different columns connected in series, because high alkalinity may significantly diminish volatility of this acid. In this case chemisorption of the gases obtained by thermo-oxidation or thermo-catalytic oxidation is performed in a separate column by alkaline solution.

The stripping-chemisorption columns can be of the spray or packed types.

In the case of flare or thermal oxidation, the modules of ultimate heating are not applied.

The heat exchanging module(s) of the tank(s) allows to change temperature of the wastewater in the tank in order to establish sufficiently high rate of evaporation of volatile organic and inorganic compounds and, on the other hand, to prevent danger of explosion of the gaseous medium.

In the case of flare or thermal oxidation of volatile organic and inorganic compound-laden gaseous medium there is only one module of ultimate heating (or incineration) and oxidation is performed in this module.

The proposed design of the stripping-chemisorption-oxidation system allows diminishing consumption of electrical energy, liquid or gaseous fuel for flare, thermal or thermo-catalytic oxidation of volatile organic and inorganic compounds contained in wastewater. This diminishment can be estimated by a factor of 2÷4.

In the case, when the wastewater contains high concentration of volatile organic and inorganic compounds, it is possible to diminish further this energy expenditure at the cost of the heat released in the process of volatile organic and inorganic compound oxidation.

In the batch version of the process, the temperature of the wastewater is changed during the process of stripping-chemisorption in such a way, that concentration of explosive volatile organic and inorganic compounds in the gaseous medium in the system is significantly lower than a dangerous level, which can cause explosion. In addition, it is possible to cool the wastewater in the tanks at the early stage of oxidation in order to prevent danger of explosion (in the case of high initial concentration of volatile organic and inorganic compounds in the wastewater).

In the continuous version of the process, there are some stripping-chemisorption-oxidation sub-units, which are arranged in line and the temperature of the wastewater is gradually elevated in the direction from the first stripping-chemisorption-oxidation sub-unit to the latter. In such a way, concentration of volatile organic and inorganic compounds in the gaseous medium of each stripping-chemisorption-oxidation sub-unit is lower than the dangerous level because gradually diminishment of volatile organic and inorganic compound concentration in the stripping-chemisorption-oxidation sub-units according to downstream of the wastewater.

The main area of application of the proposed systems is treatment of wastewaters of different facilities.

However, these systems can be used as well for treatment of groundwater in the case, when this groundwater has high level of contamination by volatile organic and inorganic compounds (for example, in the case of spillage at a facility).

In addition the proposed system can be used for incineration of water-insoluble organic liquids, for example, waste PCB. In this case, the tank(s) of the system is filled with the waste organic liquid and aqueous alkali solution in a required proportion. The tank is provided with a mixer, which generates emulsion of both components (the aqueous alkali solution and the organic liquid), this emulsion is supplied by the circulation pump to the stripping-chemisorption column.

DETAILED DESCRIPTION OF THE INVENTION

Figure 1:
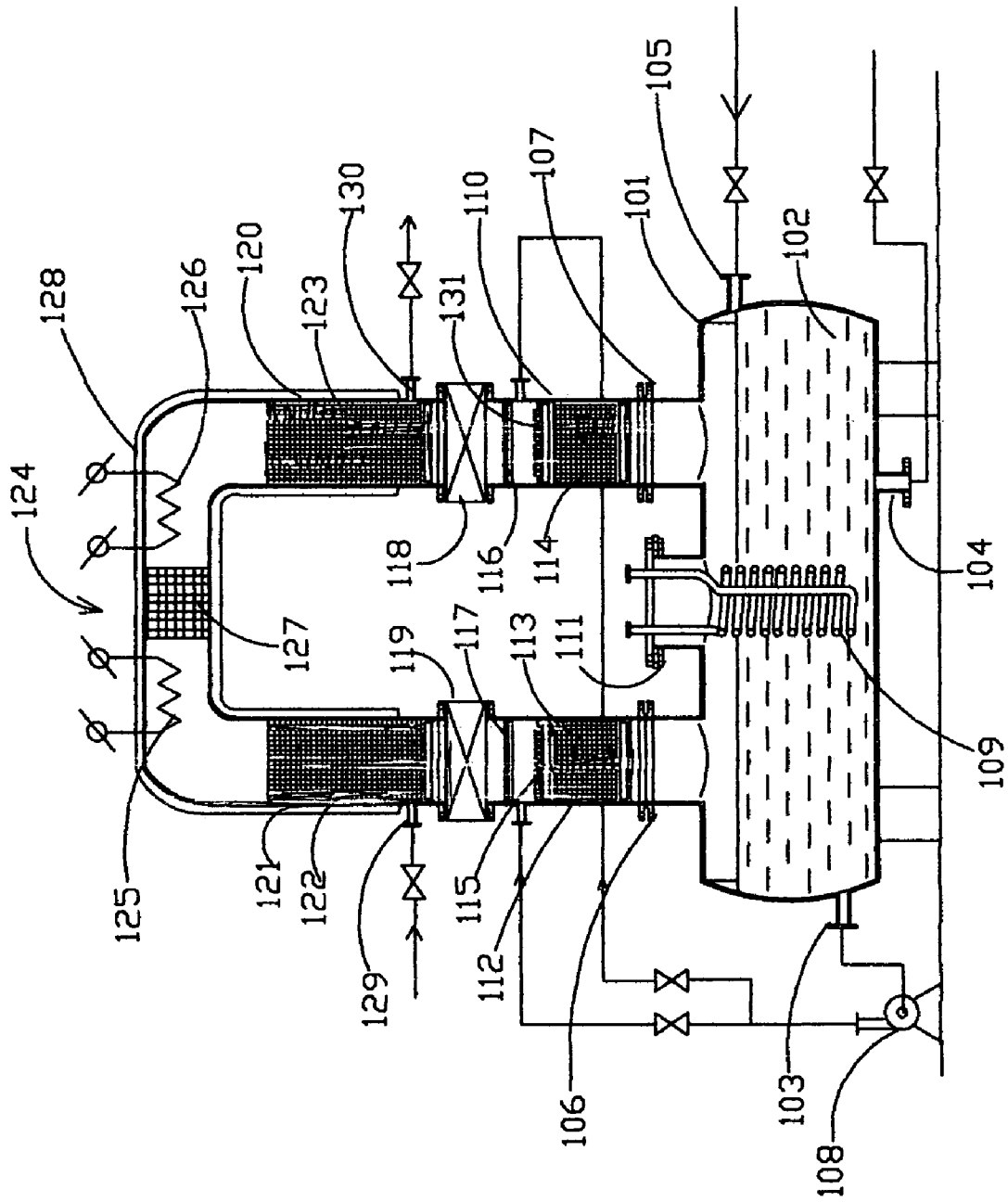
FIG. 1 is a general scheme of a system for destruction of volatile organic and inorganic compounds contained in wastewater, this scheme includes a tank with a circulating pump and two stripping-chemisorption columns; oxidation of volatile organic and inorganic compounds is performed by a thermo-catalytic unit.

FIG. 1 shows a general scheme of a batch system for destruction of volatile organic and inorganic compounds contained in wastewater by thermo-catalytic oxidation.

This scheme includes tank 101 filled with wastewater 102 in such a way, that there is a free upper space intended for circulation of the gaseous medium. The tank comprises: outlet connections 104 and 103, an inlet connection 105, flanges 106 and 107 for installation of stripping-chemisorption columns 110 and 112, a built-in heat exchanging module 109. This heat exchanging module is installed on an additional flange 111. The stripping-chemisorption columns 110 and 112 comprise packings 113 and 114, distributors 115 and 131, demisters 117 and 116. A circulation pump 108 performs circulation the wastewater via the stripping-chemisorption columns 110 and 112. Fans 118 and 119 are installed on the upper flanges of the stripping-chemisorption columns 110 and 112.

In addition, there are two heat regenerators 120 and 121 installed by their lower flanges on fans 118 and 119. The heat regenerator 120 is provided with an inlet connection 129 for oxygen delivery and the heat regenerator 121—with an outlet connection 130 for purging the entire system.

The heat regenerator 120 is filled with packing 122, and heat regenerator 121—with packing 123.

Module 124 for thermo-catalytic oxidation consists of two sub-modules 125 and 126 of ultimate heating, and a catalytic packed bed 127.

The heat regenerators 120, 121 and module 124 are provided with a thermal insulation 128.

Figure 2:
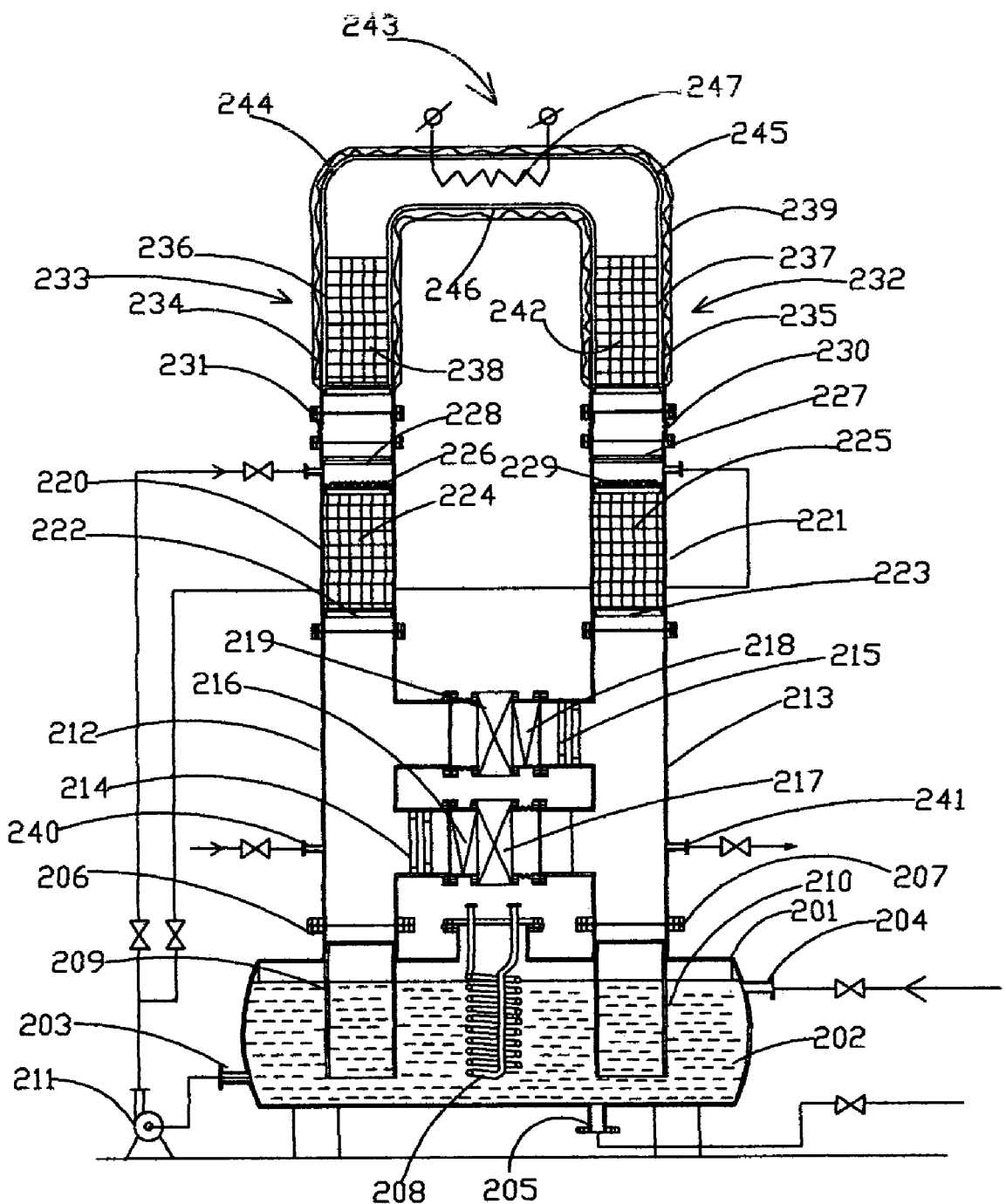
FIG. 2 is a general scheme of a system for destruction of volatile organic and inorganic compounds contained in wastewater, this system includes a tank with a circulating pump and two stripping-chemisorption columns, oxidation of volatile organic and inorganic compounds is performed by a thermal unit.

FIG. 2 shows a general scheme of a batch system for destruction of volatile organic and inorganic compounds contained in wastewater by thermal oxidation. This scheme includes tank 201 filled with wastewater 202. Tank 201 is provided with an inlet connection 204, outlet connections 203 and 204, flanges 206 and 207 for installation of two connecting branches 212 and 213. Each connecting branch is provided with two lateral tees.

In addition, tank 201 is provided with a built-in heat exchanging module 208. Tubular branches 209 and 210 are installed on flanges 206 and 207. They are immersed into the wastewater; it prevents bypass flow of the gaseous medium through the upper space of the tank.

The connecting branch 212 is provided with an inlet connection 240 for oxygen delivery, and the connecting branch 213—with an outlet connection 241 for purging the entire system. The lateral tees of the connecting branches are joined by two joints; there are demisters 214 and 215, fans 217 and 219, back draft shutters 216 and 218, which are installed in these joints.

The upper flanges of the connecting branches 212 and 213 serve for installation of two stripping-chemisorption columns 220 and 221 with supporting grids 222 and 223, and packings 224 and 225.

In addition, there are distributors 226, 229 and demisters 228, 227 installed in the stripping-chemisorption columns. Pump 211 performs supply of the wastewater into the stripping-chemisorption columns.

The upper flanges of the stripping-chemisorption columns serve for installation of their associated heat regenerators 233, 232 with packings 238 and 242. This installation is performed through two bellow joints 222 and 223.

The low sections of the heat regenerators consist off metal branches 234 and 235; refractory tubes 236 and 237 are inserted into these metal branches. These refractory tubes are joined by refractory elbows 244 and 245 with module 243 of thermal oxidation; this module comprises a refractory tube 246 and an internal electrical heater 243.

The heat regenerators 232, 233 and module 243 of thermal oxidation are provided with a thermal insulation 239.

Figure 3:
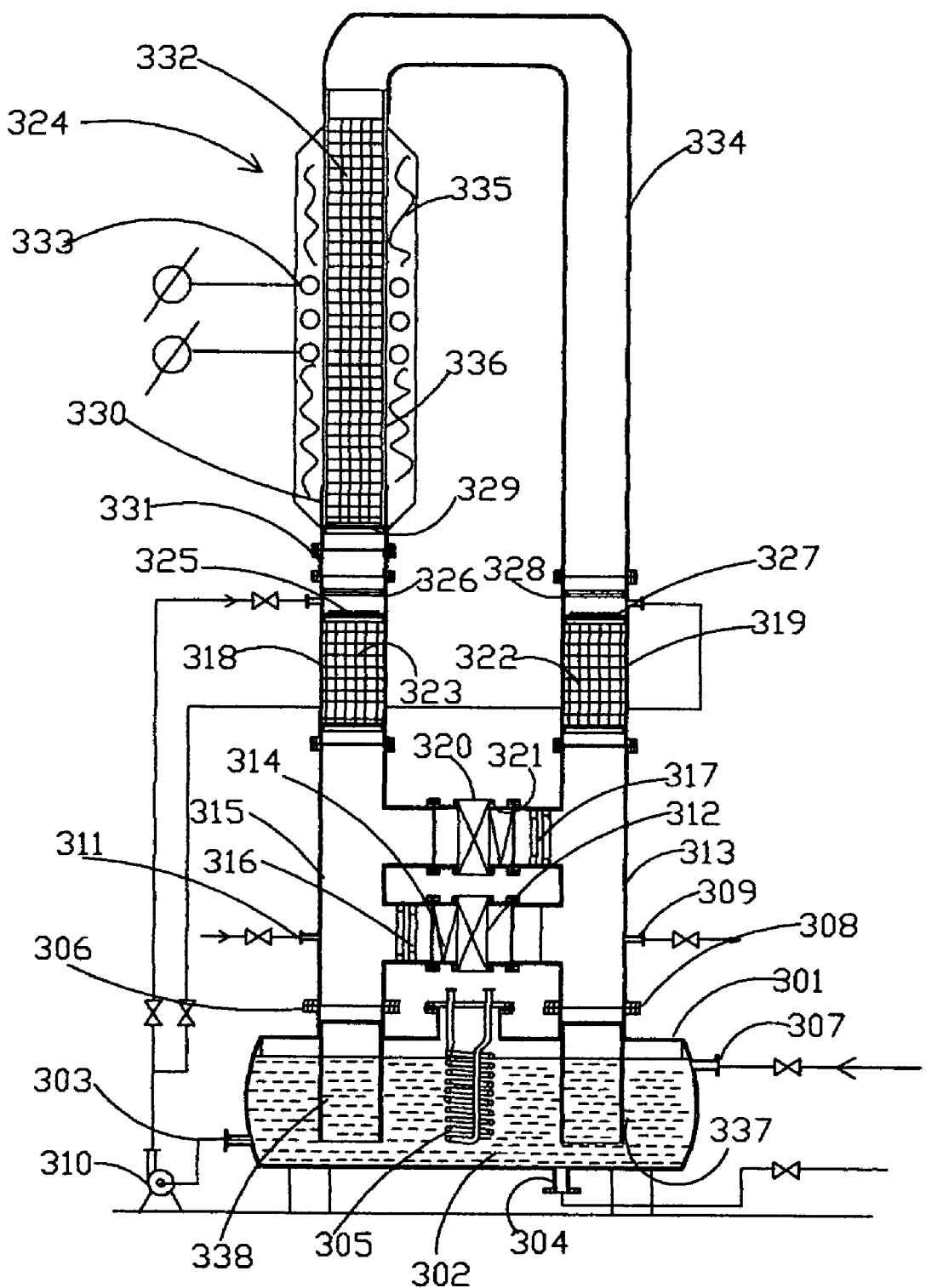
FIG. 3 is a general scheme of a system for destruction of volatile organic and inorganic compounds contained in wastewater, this system is based on thermal oxidation of volatile organic and inorganic compounds; the heat regenerators and the thermal oxidation unit are designed as one combined module.

FIG. 3 shows a general scheme of a batch system for destruction of volatile organic and inorganic compounds contained in wastewater a plant of volatile organic and inorganic compound-control in wastewater, this scheme is based on thermal oxidation of volatile organic and inorganic compounds; the heat regenerators and the unit of thermal oxidation are designed as one combined module of tubular form.

This scheme includes tank 301 filled with wastewater 302. Tank 301 is provided with an inlet connection 304, outlet connections 303 and 307, flanges 306 and 308 for installation two connecting branches 313 and 315. Each connecting branch is provided with two lateral tees.

In addition, tank 301 is provided with a built-in heat exchanging module 305. Tubular branches 337 and 338 are installed on flanges 306 and 308. They are immersed into the wastewater, it prevents bypass flow of the gaseous medium through the upper space of the tank.

The connecting branch 315 is provided with an inlet connection 311 for oxygen delivery, and the connecting branch 313—with an outlet connection 309 for purging the entire system. The lateral tees of the connecting branches are joined by two joints; there are demisters 316 and 317, fans 312 and 320, back draft shutters 314 and 321, which are installed in these joints.

The upper flanges of the connecting branches 313 and 315 serve for installation of two stripping-chemisorption columns 318 and 319 with packings 323 and 322.

In addition, there are distributors 325, 327 and demisters 326, 328 installed in the stripping-chemisorption columns. Pump 310 performs supply of the wastewater into the stripping-chemisorption columns.

The upper flange of the stripping-chemisorption column 315 serves for installation a bellow joint 331, which in turn serves for installation of a combined module 324 of heat regeneration—thermal oxidation.

The low section of the combined module 324 consists off a metal branch 330 with supporting grid 329; a refractory tube 336 is inserted into this metal branch. The refractory tube 336 is filled with packing 332.

The middle section of the refractory tube 336 is provided with an external electrical heater 333, and its lower and upper sections serve as heat regenerators. The refractory tube 336 is provided with a thermal insulation 335.

A gas duct 334 communicates the upper section of the combined module 324 with the upper flange of the stripping-chemisorption column 319.

Figure 4:
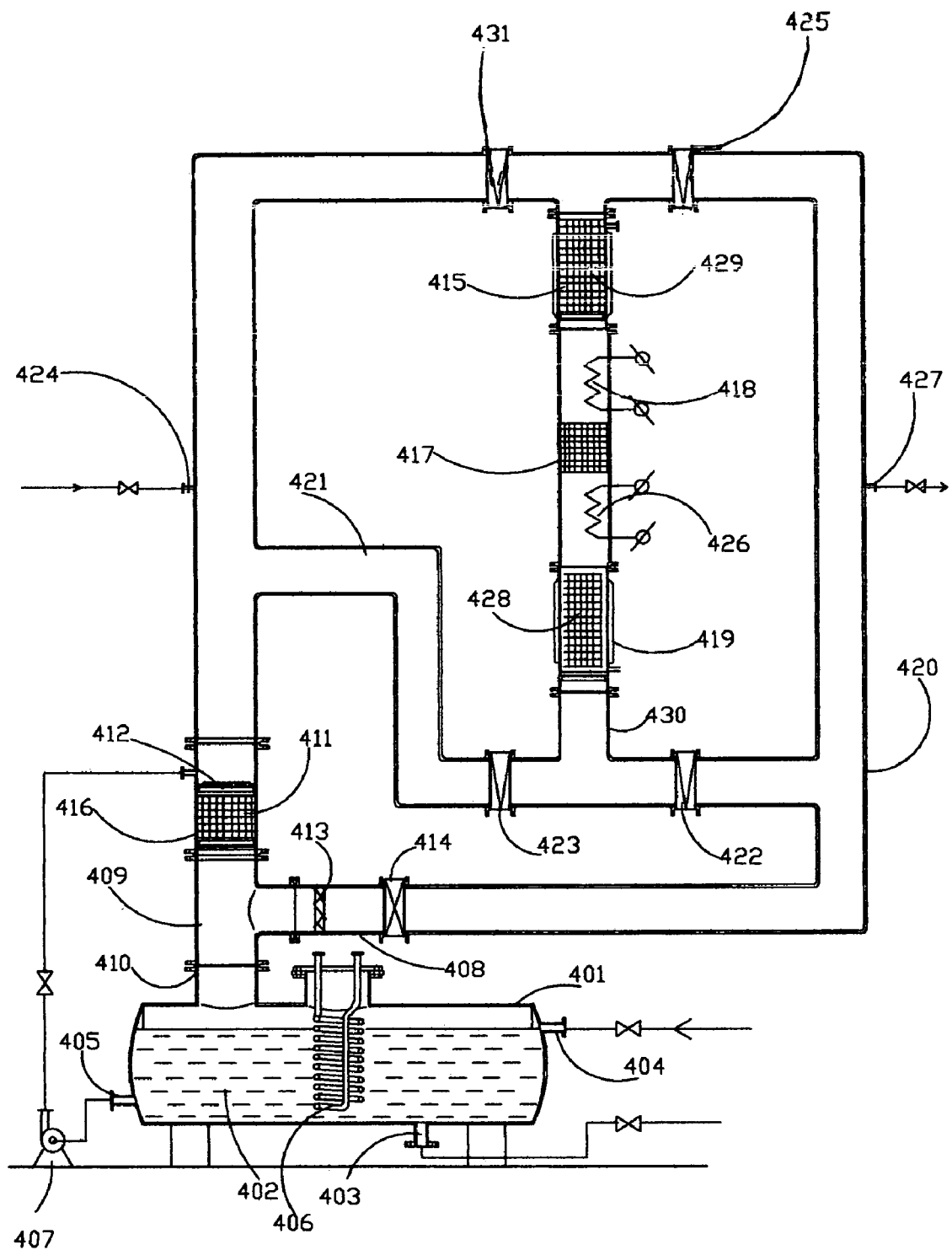
FIG. 4 is a general scheme of a system for destruction of volatile organic and inorganic compounds contained in wastewater by thermo-catalytic oxidation; this system comprises one stripping-chemisorption column and one fan.

FIG. 4 shows a general scheme of a plant of volatile organic and inorganic compound-control in wastewater by thermo-catalytic oxidation with one stripping-chemisorption column.

This scheme includes tank 401 filled with wastewater 402. The tank comprises: outlet connections 404 and 403, an inlet connection 405, flange 410 and a built-in heat exchanging module 406. Flange 410 serves for installation of a connecting branch 409 with a lateral tee.

A stripping-chemisorption column 416 is installed on the upper flange of the connecting branch 409, this column comprises packing 411 and distributor 412.

A circulation pump 407 performs circulation the wastewater via the stripping-chemisorption column 416.

The lateral tee of the connecting branch 409 is joined with the proximal edge of a gas duct 420; the distal edge of this gas duct is joined with the upper flange of the stripping-chemisorption column 416. In such a way, these units—the gas duct 420, the stripping-chemisorption column 416 and the connecting branch 409—present a closed loop for circulation of gaseous medium. The proximal section of the gas duct is provided with demister 413 and fan 414.

There is a first additional gas duct 421, which communicates the proximal and distal sections of the gas duct 420. A heat regenerator 419, module 426 of sub-module 426 of ultimate heating, module 417 of thermo-catalytic oxidation, sub-module 418 of ultimate heating, and a heat regenerator 429 are installed in-line on a second additional gas duct 430 communicating the first additional gas duct 421 with the gas duct 420.

Two pair of dampers 431, 425 and 423, 422 are installed on the gas duct 420 and the first additional gas duct 421 from both sides with respect to the second additional gas duct 430. Alternative shutting and opening the diagonally situated dampers gives possibility to alternate periodically direction of the gaseous medium flow via the aforementioned sequence of the modules and sub-modules installed on the second additional gas duct.

Figure 5:
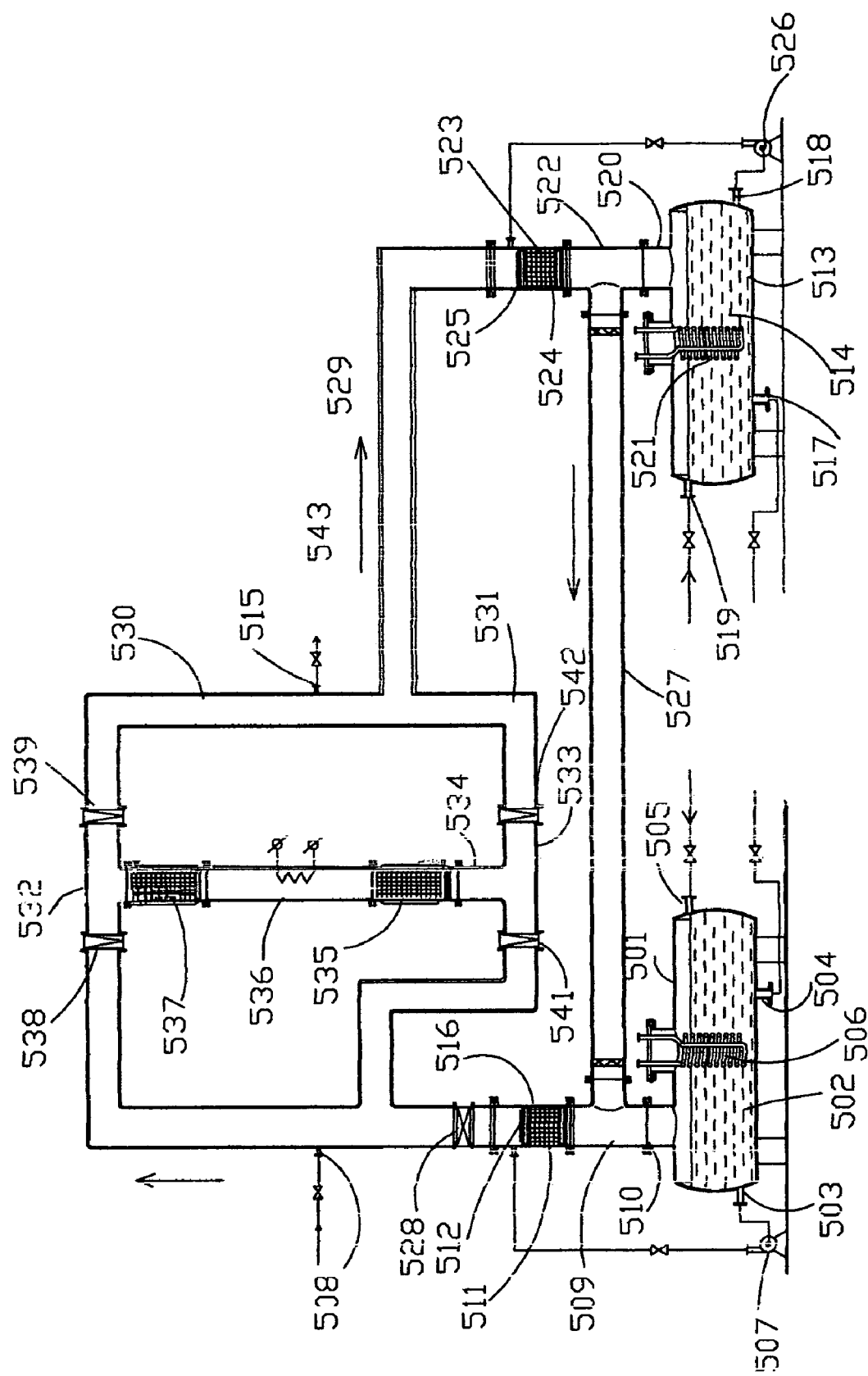
FIG. 5 is a general scheme of a system for destruction of organic acids contained in a wastewater.

FIG. 5 shows a general scheme of a system for destruction of organic acids contained in a wastewater.

This scheme includes tank 501 filled with wastewater 502. The tank comprises: outlet connections 504 and 503, an inlet connection 505, flange 510 and a built-in heat exchanging module 506. Flange 510 serves for installation of a connecting branch 509 with a lateral tee.

A stripping column 516 is installed on the upper flange of the connecting branch 509, this column comprises packing 511 and distributor 512.

A circulation pump 507 performs circulation the wastewater via the stripping column 516. There is a second tank 513 filled with alkaline solution 514. The tank comprises: outlet connections 517 and 518, an inlet connection 519, flange 520 and a built-in heat-exchanging module 521. Flange 520 serves for installation of a connecting branch 522 with a lateral tee.

A chemisorption column 523 is installed on the upper flange of the connecting branch 522, this column comprises packing 524 and distributor 525.

A circulation pump 526 performs circulation the alkaline solution via the chemisorption column 523.

The lateral tee of the connecting branch 509 is connected with the lateral tee of the connecting branch 522 by a gas duct 527.

The inlet flange of fan 528 is installed on the upper flange of the stripping column 516.

The upper flange of the chemisorption column 523 and the outlet flange of fan 528 are communicated by a gas duct 529 which is branched in two parallel gas ducts 530 and 531. The parallel gas ducts include two T-pieces 532 and 533. The central branches of these T-pieces are communicated via a gas duct 534, which incorporates a first heat regenerating bed 535, an electrical heater 536 and a second heat regenerating bed 537; these units are positioned sequentially.

The system is provided with an inlet connection 508 for supply of oxygen and/or other gases into the gaseous circuit of this system, and with an outlet connection 515 for blow-out of the excessive gases from the system.

Two pairs of dampers 538, 539 and 540, 541 are installed on the gas ducts 530 and 531 from the both sides of the central branches of T-pieces 532 and 533.

Alternative shutting and opening the diagonally situated dampers gives possibility to alternate periodically direction of the gaseous medium flow via the aforementioned sequence of the heat regenerating beds and the electrical heater.

What is claimed is:

1. A method of destruction of volatile organic and inorganic compounds in wastewater consisting of following steps, which occur consecutively or simultaneously:

adjustment of temperature and pH of said wastewater;

circulating said wastewater by a pumping means via a stripping-chemisorption column;

circulating a gaseous medium via a circulation circuit, which includes following elements and some features of their operation: said stripping-chemisorption column; two heat regeneration means; a blowing means; and a thermal oxidation means, said two heat regeneration means serve alternatively one—for preheating said gaseous medium before oxidation of said volatile organic and inorganic compounds' vapors in said thermal oxidation means and the other—for cooling said gaseous medium before its introduction into said stripping-chemisorption column; supply of oxygen into said gaseous medium during the course of said thermal oxidation, said supply is performed in such rate that it ensures safety and complete oxidation of said volatile organic and inorganic compounds;

chemisorption of products of said thermal oxidation of said volatile organic and inorganic compounds' vapors in said stripping-chemisorption column by said wastewater;

alternation of flow direction of said gaseous medium with alternating the roles of said two heat regeneration means, said alternation is performed in accordance with change of temperatures in said heat regeneration means; said alternation it is executed by said blowing means or by a system of shutting means installed on said circulation circuit.

2. A method of destruction of volatile organic and inorganic compounds in wastewater consisting of following steps, which occur consecutively or simultaneously:

adjustment of temperature and pH of said wastewater;

circulating said wastewater by a pumping means via a stripping-chemisorption column;

circulating a gaseous medium via a circulation circuit, which includes following elements and some features of their operation: said stripping-chemisorption column; two heat regeneration means; a blowing means; and a flare oxidation means, said two heat regeneration means serve alternatively one—for preheating said gaseous medium before oxidation of said volatile organic and inorganic compounds' vapors in said flare oxidation means and the other—for cooling said gaseous medium before its introduction into said stripping-chemisorption column; supply of oxygen into said gaseous medium during the course of said flare oxidation, said supply is performed in such rate that it ensures safety and complete oxidation of said volatile organic and inorganic compounds;

chemisorption of products of said flare oxidation of said volatile organic and inorganic compounds' vapors in said stripping-chemisorption column by said wastewater;

alternation of flow direction of said gaseous medium with alternating the roles of said two heat regeneration means, said alternation is performed in accordance with change of temperatures in said heat regeneration means; said alternation it is executed by said blowing means or by a system of shutting means installed on said circulation circuit.

3. A method of destruction of volatile organic and inorganic compounds in wastewater consisting of following steps, which occur consecutively or simultaneously;

adjustment of temperature and pH of said wastewater;

circulating said wastewater by a pumping means via a stripping-chemisorption column;

circulating a gaseous medium via a circulation circuit, which includes following elements and some features of their operation: said stripping-chemisorption column; two heat regeneration means; a blowing means; and a thermo-catalytic oxidation means, said two heat regeneration means serve alternatively one—for preheating said gaseous medium before oxidation of said volatile organic and inorganic compounds' vapors in said thermo-catalytic oxidation means and the other—for cooling said gaseous medium before its introduction into said stripping-chemisorption column; supply of oxygen into said gaseous medium during the course of said thermo-catalytic oxidation, said supply is performed in such rate that it ensures safety and complete oxidation of said volatile organic and inorganic compounds;

chemisorption of products of said thermo-catalytic oxidation of said volatile organic and inorganic compounds' vapors in said stripping-chemisorption column by said wastewater;

alternation of flow direction of said gaseous medium with alternating the roles of said two heat regeneration means, said alternation is performed in accordance with change of temperatures in said heat regeneration means; said alternation it is executed by said blowing means or by a system of shutting means installed on said circulation circuit.

4. A system for performing the method of destruction as claimed in claim 3, wherein said system comprises the following main elements and units a tank that is filled with said wastewater in such a way, that there is free space at the upper internal space of said tank intended for circulation of a gaseous medium; said tank is provided with outlet connections, at least one inlet connection, a heat exchanging module, two tubular connectors with flanges;

two stripping-chemisorption columns, which are installed on said flanges of said tank, each said stripping-chemisorption column comprises demisters installed in their upper sections;

a circulation pump which performs circulation of said wastewater via said stripping-chemisorption columns;

two fans are installed on upper flanges of said stripping-chemisorption columns, said fans are actuated alternatively;

two heat regenerators with packings are joined with the upper sections of their associated stripping-chemisorption columns;

a module for thermo-catalytic oxidation, which consists of two sub-modules of ultimate heating and a catalytic packed bed said module is communicated with said heat regenerators;

one of said unit is provided with an inlet connection for oxygen delivery and the other—with an outlet connection for purging said entire system.

5. A system for performing the method of destruction as claimed in claim 1, wherein said system comprises the following main elements and units a tank that is filled with said wastewater in such a way, that there is free space at the upper internal space of said tank intended for circulation of a gaseous medium; said tank is provided with outlet connections, at least one inlet connection, a heat exchanging module, two tubular connectors with flanges;

two stripping-chemisorption columns, which are installed on said flanges of said tank, each said stripping-chemisorption column comprises demisters installed in their upper sections;

a circulation pump which performs circulation of said wastewater via said stripping- chemisorption columns;

two fans are installed on upper flanges of said stripping-chemisorption columns, said fans are actuated alternatively;

two heat regenerators with packings are joined with the upper sections of their associated stripping-chemisorption columns;

a module for thermo oxidation, said module is communicated with said heat regenerators;

one of said unit is provided with an inlet connection for oxygen delivery and the other—with an outlet connection for purging said entire system.

6. A system for performing the method of destruction as claimed in claim 2, wherein said system comprises the following main elements and units a tank that is filled with said wastewater in such a way, that there is free space at the upper internal space of said tank intended for circulation of a gaseous medium; said tank is provided with outlet connections, at least one inlet connection, a heat exchanging module, two tubular connectors with flanges;

two stripping-chemisorption columns, which are installed on said flanges of said tank, each said stripping-chemisorption column comprises demisters installed in their upper sections;

a circulation pump which performs circulation of said wastewater via said stripping- chemisorption columns;

two fans are installed on upper flanges of said stripping-chemisorption columns, said fans are actuated alternatively;

two heat regenerators with packings are joined with the upper sections of their associated stripping-chemisorption columns;

a module for flare oxidation, said module is communicated with said heat regenerators;

one of said unit is provided with an inlet connection for oxygen delivery and the other—with an outlet connection for purging said entire system.

7. A system of destruction of volatile organic and inorganic compounds in wastewater as claimed in claim 5, wherein there are two connecting branches installed on said flanges of said tank; each said connecting branch is provided with two lateral tees; two tubular branches are installed as well on said flanges of said tank, said tubular branches are immersed into said wastewater preventing bypass flow of said gaseous medium through the upper space of said tank; the lateral tees of said connecting branches are joined by two joints; there are a demister, fan and a back draft shutter, which are installed in each joints; the upper flanges of said connecting branches serve for installation of said stripping-chemisorption columns.

8. A system of destruction of volatile organic and inorganic compounds in wastewater as claimed in claim 7, wherein said heat regenerators and said module of thermal oxidation are constructed as a combined module in the form of a refractory tube with a packing, the middle section of said refractory tube is provided with a heater and its extreme sections serves as said heat regenerators.

9. A system of destruction of volatile organic and inorganic compounds in wastewater as claimed in claims 4, wherein said system is provided with sensors for measuring concentration of said volatile organic and inorganic compounds and/or temperatures in different places of said system.

10. A system of destruction of volatile organic and inorganic compounds in wastewater as claimed in claim 9, wherein said sensors are connected with a regulation unit intended to adjust some parameters of functioning said system as: rate of oxygen delivery into said system, temperature in said tank.

11. A system of destruction of volatile organic and inorganic compounds in wastewater as claimed in claims 4, wherein said volatile organic compounds are partially insoluble in said wastewater and said tank is provided with means of emulsification of said volatile organic compounds, in said wastewater.

12. A system of destruction of volatile organic and inorganic compounds in wastewater as claimed in claim 4, said tank is provided with one flange, which serves for installation of a connecting branch provided with a lateral tee; the upper flange of said connecting branch serves in turn for installation of a stripping-chemisorption column; said lateral tee of said connecting branch is joined with the proximal edge of a gas duct; the distal edge of said gas duct is joined with the upper flange of said stripping-chemisorption column; the proximal section of said gas duct is provided with a demister and fan which operates continuously; there is a first additional gas duct, which communicates the proximal and distal sections of said gas duct, said heat regenerators and said module of thermo-catalytic oxidation are installed in-line on a second additional gas duct communicating said first additional gas duct with said gas duct; in addition, there are two pair of dampers, which are installed in said gas duct and said first additional gas duct from both sides with respect to said second additional gas duct; alternative shutting and opening said diagonally situated dampers alternates periodically direction of said gaseous medium flow via said heat regenerators and said module of thermo-catalytic oxidation installed in said second additional gas duct.

13. A system of destruction of volatile organic and inorganic compounds in wastewater, wherein said system operates continuously and it constitutes two or more sub-units connected in-line; each said sub-unit is constructed as a system claimed in claims 4, delivery of said wastewater into said first sub-unit is performed in continuous way and each said sub-unit is provided with a valve(s), which determines ratio between amounts of said wastewater supplied into its operating stripping-chemisorption column and into following sub-unit, or between amounts of said wastewater supplied into its operating chemisorption column and rejected from said system in the case of latter said latter sub-unit; delivery of oxygen into each said sub-unit is performed independently.

14. A system of destruction of volatile organic and inorganic compounds in wastewater as claimed in claim 12, wherein said wastewater contains volatile organic and/or inorganic compounds; said system includes two tanks: a first one, which should be filled with said wastewater; said first tank comprises: outlet connections, an inlet connection, a flange and a built-in heat exchanging module; said flange serves for installation of a first connecting branch with a first lateral tee; a stripping column is installed on the upper flange of said first connecting branch; there is a first circulation pump, which performs circulation said wastewater via said stripping column; there is a second tank which filled with alkaline solution, said second tank comprises: outlet connections, an inlet connection, a second flange and a second built-in heat-exchanging module; said second flange serves for installation of a second connecting branch with a second lateral tee; a chemisorption column is installed on the upper flange of said second connecting branch; a second circulation pump performs circulation said alkaline solution via said chemisorption column; said second lateral tee of said second connecting branch is connected with said first lateral tee of said first connecting branch by a first gas duct; there is a fan, the inlet flange of said fan is installed on the upper flange of said stripping column; the upper flange of said chemisorption column and the outlet flange said fan are communicated by a second gas duct which is branched in two parallel gas sub-ducts; said parallel gas sub-ducts include two T-pieces; the central branches of said T- pieces are communicated via a third gas duct, which incorporates a first heat regenerating bed, an electrical heater and a second heat regenerating bed; which units are positioned sequentially; two pairs of dampers are installed on the said gas sub-ducts from the both sides of said central branches of said T-pieces.

15. A system of destruction of volatile organic and inorganic compounds in wastewater as claimed in claim 5, wherein said system is provided with sensors for measuring concentration of said volatile organic and inorganic compounds and/or temperatures in different places of said system.

16. A system of destruction of volatile organic and inorganic compounds in wastewater as claimed in claim 6, wherein said system is provided with sensors for measuring concentration of said volatile organic and inorganic compounds and/or temperatures in different places of said system.

17. A system of destruction of volatile organic and inorganic compounds in wastewater as claimed in claim 5, wherein said volatile organic compounds are partially insoluble in said wastewater and said tank is provided with means of emulsification of said volatile organic compounds, in said wastewater.

18. A system of destruction of volatile organic and inorganic compounds in wastewater as claimed in claim 6, wherein said volatile organic compounds are partially insoluble in said wastewater and said tank is provided with means of emulsification of said volatile organic compounds, in said wastewater.

* * * * *